(12) United States Patent
Rauscher et al.

(10) Patent No.: US 10,012,156 B2
(45) Date of Patent: Jul. 3, 2018

(54) METHOD AND DEVICE FOR DETERMINING A SIGNAL OFFSET BETWEEN A CRANKSHAFT ANGLE SIGNAL AND A COMBUSTION CHAMBER PRESSURE SIGNAL IN AN INTERNAL COMBUSTION ENGINE

(71) Applicant: Robert Bosch GmbH, Stuttgart (DE)

(72) Inventors: Martin Rauscher, Ludwigsburg (DE); Andreas Roth, Muehlacker-Lomersheim (DE); Raffael Hedinger, Zürich (CH); Wolfgang Fischer, Gerlingen (DE); David Gaenzle, Leinfelden-Echterdingen (DE); Christopher H. Onder, Weisslingen (CH)

(73) Assignee: ROBERT BOSCH GMBH, Stuttgart (DE)

( * ) Notice: Subject to any disclaimer, the term of this patent is extended or adjusted under 35 U.S.C. 154(b) by 208 days.

(21) Appl. No.: 15/051,349

(22) Filed: Feb. 23, 2016

(65) Prior Publication Data

US 2016/0258367 A1  Sep. 8, 2016

(30) Foreign Application Priority Data

Mar. 2, 2015 (DE) .......................... 10 2015 203 637

(51) Int. Cl.
*F02D 35/00* (2006.01)
*F02D 41/04* (2006.01)
(Continued)

(52) U.S. Cl.
CPC .......... *F02D 35/024* (2013.01); *F02D 35/023* (2013.01); *F02D 41/009* (2013.01);
(Continued)

(58) Field of Classification Search
CPC .... F02D 35/024; F02D 35/023; F02D 41/009; F02D 41/2432; F02D 41/008; G01M 15/08
(Continued)

(56) References Cited

U.S. PATENT DOCUMENTS 5,408,872 A * 4/1995 Nonaka .................. F02D 41/32
  73/114.33
6,367,317 B1 * 4/2002 Jaye ...................... G01M 15/06
  73/114.16
(Continued)

FOREIGN PATENT DOCUMENTS

DE    102009043431    3/2011

*Primary Examiner* — Peter Macchiarolo
*Assistant Examiner* — Anthony W Megna Fuentes
(74) *Attorney, Agent, or Firm* — Norton Rose Fulbright US LLP; Gerard Messina (57) ABSTRACT

A method for determining a signal offset between a crankshaft angle signal and a combustion chamber pressure signal includes: measuring the combustion chamber pressure signal; shifting an alignment of the measured combustion chamber pressure signal with respect to the crankshaft angle signal by a plurality of respective offset angles to generate a plurality of offset combustion chamber pressure signals; reconstructing the offset combustion chamber pressure signals using a plurality of predetermined inherent pressure curves to generate reconstructed combustion chamber pressure signals; determining reconstruction errors of the reconstructed combustion chamber pressure signals as a function of differences between the offset combustion chamber pressure signals and the reconstructed combustion chamber pressure signals; and determining the signal offset between the crankshaft angle signal and the combustion chamber pressure signal as a one of the plurality of offset angles producing the reconstruction error having the lowest value.

8 Claims, 5 Drawing Sheets

(51) Int. Cl.
  *G01M 15/08* (2006.01)
  *G01M 15/06* (2006.01)
  *F02D 35/02* (2006.01)
  *F02D 41/00* (2006.01)
  *F02D 41/24* (2006.01)

(52) U.S. Cl.
  CPC ........... *G01M 15/08* (2013.01); *F02D 41/008* (2013.01); *F02D 41/2432* (2013.01)

(58) Field of Classification Search
  USPC .......................................................... 73/114
  See application file for complete search history.

(56) References Cited

U.S. PATENT DOCUMENTS

| | | | | |
|---|---|---|---|---|
| 2004/0236496 | A1* | 11/2004 | Sobel | F02D 35/0007 701/114 |
| 2007/0271025 | A1* | 11/2007 | Yasui | F02D 41/1406 701/102 |
| 2007/0277591 | A1* | 12/2007 | Hoshi | F02D 35/023 73/35.05 |
| 2008/0154450 | A1* | 6/2008 | Sinnamon | F02D 35/023 701/20 |
| 2009/0101110 | A1* | 4/2009 | Hathout | F02D 35/023 123/406.43 |
| 2013/0060447 | A1* | 3/2013 | Guerrassi | F02D 35/025 701/102 |
| 2014/0257670 | A1* | 9/2014 | Tsuchiya | F02D 41/1401 701/102 |

\* cited by examiner

METHOD AND DEVICE FOR DETERMINING A SIGNAL OFFSET BETWEEN A CRANKSHAFT ANGLE SIGNAL AND A COMBUSTION CHAMBER PRESSURE SIGNAL IN AN INTERNAL COMBUSTION ENGINE

CROSS REFERENCE

The present application claims the benefit under 35 U.S.C. § 119 of German Patent Application No. 102015203637.5 filed on Mar. 2, 2015, which is expressly incorporated herein by reference in its entirety.

FIELD

The present invention relates to a method for determining a signal offset between a crankshaft angle signal and a combustion chamber pressure signal in an internal combustion engine, in which an instantaneously measured combustion chamber pressure profile is compared to a calculated, modeled combustion chamber pressure profile, and to a device for carrying out the method.

BACKGROUND INFORMATION

In internal combustion engines, signal offsets occur between a crankshaft angle signal and a combustion chamber pressure signal, which are referred to as TDC errors. An occurring TDC error disadvantageously affects the combustions of the internal combustion engine controlled as a function of the combustion chamber pressure. To correct this signal offset, crank angle positions of the maximum combustion chamber pressure are compared during drag operation to crank angle positions in situations without TDC errors. The situations in which the internal combustion engine is in drag operation are becoming increasingly rarer, which is why the correction options for the TDC error are limited.

A method for determining a correction for a measured combustion chamber pressure is described in German Patent Application No. DE 10 2009 043 431 A1, in which a pressure profile over a crankshaft angle $\varphi_1$ at the beginning of a compression phase to a crankshaft angle $\varphi_2$ at the end of the compression phase is determined and compared to a calculated modeled pressure profile for the compression phase from $\varphi_1$ to $\varphi_2$. A value for an amplitude correction of the combustion chamber pressure and a value for a crankshaft angle correction of the measured combustion chamber pressure are determined from a difference profile over the crank angle $\varphi$ in the compression phase from $\varphi_1$ to $\varphi_2$ of the measured pressure profile and the modeled pressure profile.

SUMMARY

It is therefore an object of the present invention to provide a method for determining a signal offset between a crankshaft angle signal and a combustion chamber pressure signal, which may be reliably determined during all operating states of the internal combustion engine.

According to an example embodiment of the present invention, the object may be achieved in that the instantaneously measured combustion chamber pressure profile is shifted with respect to the calculated, modeled combustion chamber pressure profile along a crankshaft angle to generate an artificial signal offset, and a reconstruction quality is determined from this shifted combustion chamber pressure profile in that a reconstruction error is ascertained from the artificial signal offset along the crankshaft angle of the shifted instantaneously measured combustion chamber pressure profile as a measure of the signal offset between the crankshaft angle signal and the combustion chamber pressure signal. This procedure is independent of the instantaneous operating state of the running internal combustion engine, so that the effective signal offset may be reliably determined at any time. With the aid of this artificial signal offset, it is possible to clearly determine the difference from the instantaneously measured combustion chamber pressure profile. To approach the actual signal offset of the measured combustion chamber pressure profile to be determined, the measured combustion chamber pressure curve is shifted both in the positive and in the negative direction along the crankshaft angle. The artificially introduced signal offset, for which a minimal reconstruction error results, corresponds proportionally to the signal offset associated with the instantaneous measurement.

Advantageously, at least one reference pressure curve, from which inherent pressures are calculated with the aid of a mathematical model, is measured for the determination of the modeled combustion chamber pressure curve profile. This has the advantage that the signal offset is determined based on a crank angle-resolved cylinder pressure measurement in the internal combustion engine, a comparison profile being generated from the reference value with the aid of a mathematical method.

In one specific embodiment, the at least one reference pressure curve is measured at different operating points of the internal combustion engine over a crankshaft angle. Due to the different operating points, a combustion chamber pressure curve exists as a reference curve for every operating state of the internal combustion engine during the ongoing operation.

In one embodiment, the at least one reference pressure curve is measured once during an initialization process. During this reference pressure measurement, it is assumed that the internal combustion engine has a very exact, known geometry, which is why a small existing TDC error is presumed.

In one variant, the inherent pressures are determined from the at least one reference pressure curve using a principal component analysis (PCA) method. In this PCA method, the pressure curves are restored in a further step from a linear combination of inherent pressures which were previously extracted from a number of reference pressure signals.

In one specific embodiment, a signal offset between the crankshaft angle signal and the combustion chamber pressure signal of approximately zero is assumed for the at least one reference pressure curve. This assumption allows a reliable comparison of the inherent pressures extracted from the at least one reference pressure curve to an instantaneously measured combustion chamber pressure curve.

In one embodiment, the predefined number of inherent pressures is distributed over a predefined crankshaft angle range, preferably of 360°, during the reconstruction. The distribution over 360° crankshaft angles ensures that an entire combustion cycle of a cylinder of the internal combustion engine is always taken into consideration in the reconstruction of the inherent pressure curve. To enable a faster calculation, it is also possible to select a range of less than 360°. A reconstruction over 120° crankshaft angles would also suffice, for example. Advantageously, the crankshaft angle range is selected symmetrically around the top dead center since the combustion chamber pressure signals have the most information content there.

In one specific embodiment, the instantaneously measured combustion chamber pressure curve is corrected in the crankshaft angle range with the minimal reconstruction error. In this way, a correction value for correcting the combustion chamber pressure signal is easily determined from the comparison of the reconstructed inherent pressure curve to the instantaneous combustion chamber pressure profile. This combustion chamber pressure signal thus corrected results in a reliable control of the processes of the internal combustion engine.

One refinement of the present invention relates to a device for determining a signal offset between a crankshaft angle signal and a combustion chamber pressure signal in an internal combustion engine, which is connected to a combustion chamber pressure sensor and a crankshaft angle sensor for measuring an instantaneous combustion chamber pressure profile of the internal combustion engine and which includes a processing unit for comparing the instantaneous combustion chamber pressure profile to a calculated, modeled combustion chamber pressure profile. In a device which may be used to determine the signal offset between the crankshaft angle signal and the combustion chamber pressure angle signal in every operating state of the running internal combustion engine, means are present which shift the instantaneously measured combustion chamber pressure profile with respect to the calculated, modeled combustion chamber pressure profile along a crankshaft angle for the generation of an artificial signal offset and which reconstruct a pressure curve from this shift, whose reconstruction quality is determined in that, from the artificial signal offset along the crankshaft angle of the shifted instantaneously measured combustion chamber pressure curve, a reconstruction error is ascertained as a measure of the signal offset between the crankshaft angle signal and the combustion chamber pressure signal. The present invention allows a plurality of specific embodiments. One of these is described in greater detail below based on the figures.

DETAILED DESCRIPTION OF EXAMPLE EMBODIMENTS

Figure 1:
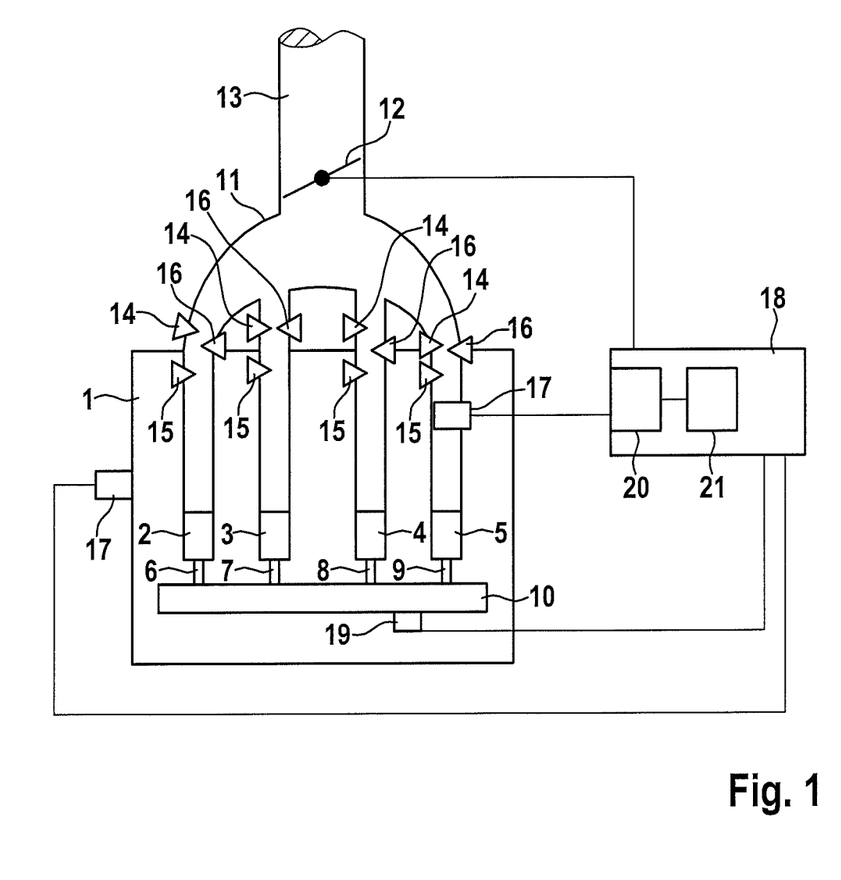
FIG. 1 shows a schematic diagram of an internal combustion engine.

FIG. 1 shows a schematic diagram of an internal combustion engine. Internal combustion engine 1 in this example includes four cylinders 2, 3, 4, 5, whose pistons, which are not shown in greater detail and move in cylinders 2, 3, 4, 5, are connected in each case via a connecting rod 6, 7, 8, 9 to crankshaft 10 and drive the same as a result of the pressure change caused by the combustion. Cylinders 2, 3, 4, 5 are connected to an intake manifold 11, which is closed with respect to an air intake manifold 13 by a throttle valve 12. A nozzle 14 for injecting fuel and an intake valve 15 for the fresh air protrude into each cylinder 2, 3, 4, 5, whereby a fuel-air mixture forms in cylinder 2, 3, 4, 5. Moreover, each cylinder 2, 3, 4, 5 includes an exhaust valve 16 for the exhaust gases which are created during the combustion process.

A combustion chamber pressure sensor 17 is situated in each cylinder 2, 3, 4, 5, whose signals are forwarded to a control unit 18. For the sake of clarity, FIG. 1 shows only one combustion chamber pressure sensor 17 on cylinder 5. Control unit 18 is also connected to a crankshaft sensor 19 situated opposite of crankshaft 10, control unit 18 assigning the signals of combustion chamber pressure sensors 17 to the signal of crankshaft sensor 19 which represents a crankshaft angle. Control unit 18 furthermore includes a microprocessor 20, which is connected to a memory 21.

Figure 2:
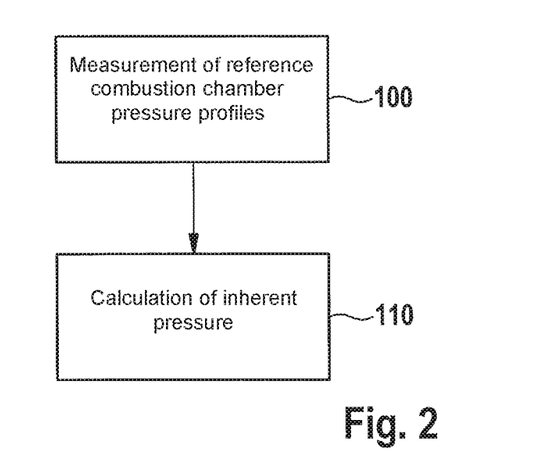
FIG. 2 shows one exemplary embodiment of an initialization of the method according to the present invention.

During the control of internal combustion engine 1, the combustion chamber pressure signal dependent on the crankshaft angle signal is evaluated. However, since a signal offset frequently exists between this combustion chamber pressure signal and the crankshaft angle signal, which hereafter is to be referred to as TDC error, it is necessary to correct this signal offset. For this purpose, a reference operation is carried out once on the internal combustion engine on an engine test bench during the initialization phase shown in FIG. 2. Under the assumption that the TDC errors are approximately zero during this reference operation, combustion chamber pressure curves are measured (block 100) with the associated crankshaft angles at different operating points of internal combustion engine 1. These combustion chamber pressure curves are used as reference pressure curves. In block 110, inherent pressures $n_{PCA}$, which are stored in memory 21, are calculated from these reference pressure curves with the aid of the principal component analysis (PCA) method.

The PCA method is based on modeling combustion chamber pressure curves from a linear combination of the PCA inherent pressures which were previously extracted from a number of reference pressure signals.

The inherent pressures represent pressure signals having the same discrete length as the original cylinder pressure signal of one cylinder 2, 3, 4, 5 in each case. The inherent pressures are defined by a singular value decomposition from the M reference pressure curves $\vec{p}_k, k=1, \ldots M$ having length n. According to $$U\Sigma V^T = P \tag{1}$$

P is a matrix which contains information about the reference pressure curves.

$$p_{N \times M} = ([\vec{p}_1, \vec{p}_2, \ldots, \vec{p}_M]\vec{p}_{mean}) \tag{2}$$

and $\vec{p}_{mean}$ is the averaged pressure profile of all reference pressure curve profiles $\vec{p}_k$.

$$\vec{p}_{mean} = \frac{1}{M} \sum_1^M \vec{p}_k \tag{3}$$

Matrix $\Sigma$ contains the singular values of the singular value decomposition. U and V denote two orthogonal matrices.

Figure 3A:
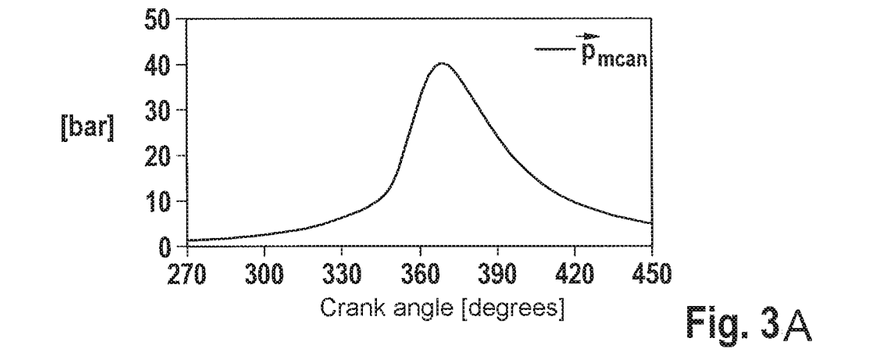
FIG. 3A shows an exemplary embodiment of an averaged pressure profile.
Figure 3B:
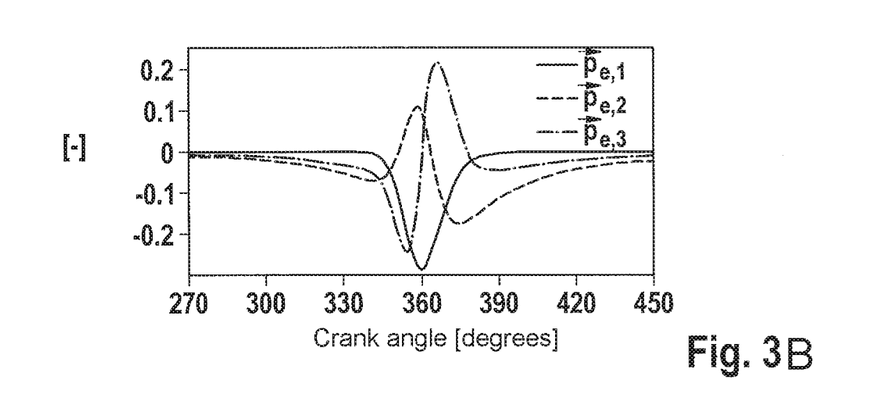
FIG. 3B shows an exemplary embodiment of an averaged pressure profile.

Matrix U contains N vertical vectors $p_{e,i}$, the so-called inherent pressures. These are signals having the same length as the original combustion chamber pressure signal and represent the "main variance directions" of the set of curves, the reference pressure curves. FIG. 3 shows the averaged pressure profile $\vec{p}_{mean}$ (FIG. 3a) and the first three inherent pressures $p_{e,1}$, $p_{e,2}$, $p_{e,3}$ (FIG. 3b).

Every pressure cycle $\vec{p}_k$ may be reconstructed or approximated very precisely from a linear combination of the first $n_{PCA}$ inherent pressures.

$$\vec{p}_{k,reconstructed}(n_{PCA}) = \vec{p}_{mean} + \Theta_1 \cdot \vec{p}_{e,1} + \Theta_2 \cdot \vec{p}_{e,2} + \ldots + \Theta_{nPCA} \cdot \vec{p}_{e,nPCA} \quad (4)$$

Figure 4A:
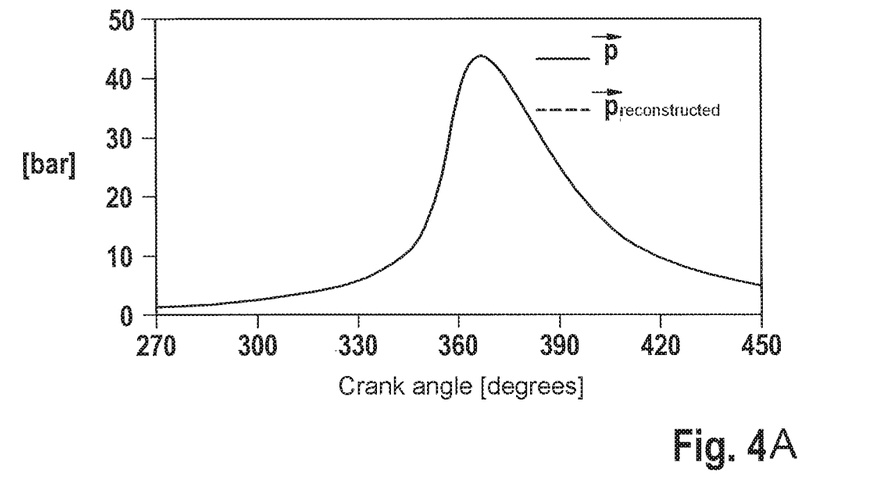
FIG. 4A shows an exemplary embodiment of a comparison of a pressure profile to its reconstruction.
Figure 4B:
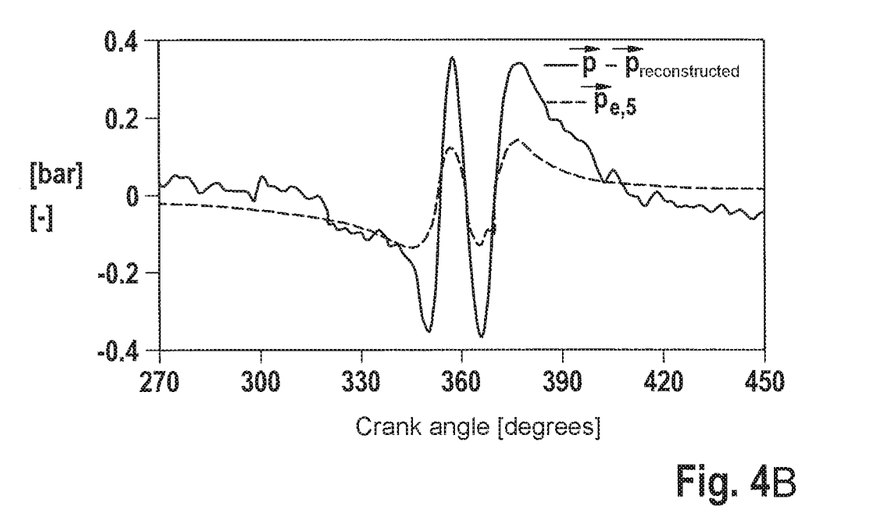
FIG. 4B shows an exemplary embodiment of a comparison of a pressure profile to its reconstruction.

The accuracy of the approximation depends, of course, on the number of inherent pressures $n_{PCA}$ used. FIG. 4a shows the reconstruction of a combustion chamber pressure profile having four inherent pressure curves according to equation (4), curves p or $p_{reconstructed}$ being situated on top of each other. It is apparent that a very small number of inherent pressures already allows a very exact reconstruction. The fifth inherent pressure curve $p_{e,5}$ has a similar shape as the absolute error $p - p_{reconstructed}$ using four inherent pressures in the reconstruction (FIG. 4b).

The linear coefficients $\Theta_i$ used in the reconstruction are referred to as PCA coefficients and are defined as the projection of the measured combustion chamber pressure curve onto the respective inherent pressure curves $p_{e,i}$. They may be calculated accordingly using a simple scalar product.

$$\Theta_i = (\vec{p}_k \cdot \vec{p}_{mean})^T \cdot \vec{p}_{ej}$$

The PCA methodology for determining the TDC error is based on the observation that the reconstruction of a measured pressure curve having a defined number of PCA inherent pressures $n_{PCA}$ according to equation (4) generally degrades if the pressure curve was recorded with a TDC error. The TDC error is defined here as a TDC offset relative to the TDC position of the pressure curves which were used to calculate the inherent pressures $n_{PCA}$.

The inherent pressures $n_{PCA}$ calculated during the initialization are stored in memory 21 of control unit 18 and used to determine the TDC error during the ongoing operation of internal combustion engine 1. According to FIG. 5, the determination of the TDC error is carried out proceeding from a measured instantaneous combustion chamber pressure profile (block 200) having a potential TDC error in that the instantaneously measured combustion chamber pressure curve for inherent pressures $n_{PCA}$ is shifted incrementally both in the positive and negative crankshaft directions (block 210). During a shift which is set once and for which the instantaneously measured combustion chamber pressure curve takes on a certain crankshaft position with respect to the inherent pressure curve $n_{PCA}$ determined from the inherent pressures, the shifted pressure curve is reconstructed by the inherent pressures calculated during the initialization (block 220). All reconstructions take place with a defined number of inherent pressures $n_{PCA}$. During this reconstruction, the inherent pressure curve is restored from the inherent pressures $n_{PCA}$ which were previously extracted from the reference pressure signals. The defined number of inherent pressures $n_{PCA}$ is distributed over a defined crankshaft angle range, for example 360°, so that an entire cycle of every cylinder 2, 3, 4, 5 is covered. Blocks 210 and 220 are repeated for every further shift of the instantaneously measured combustion chamber pressure curve with respect to the inherent pressures ascertained from the reference combustion chamber pressure curves.

Figure 5:
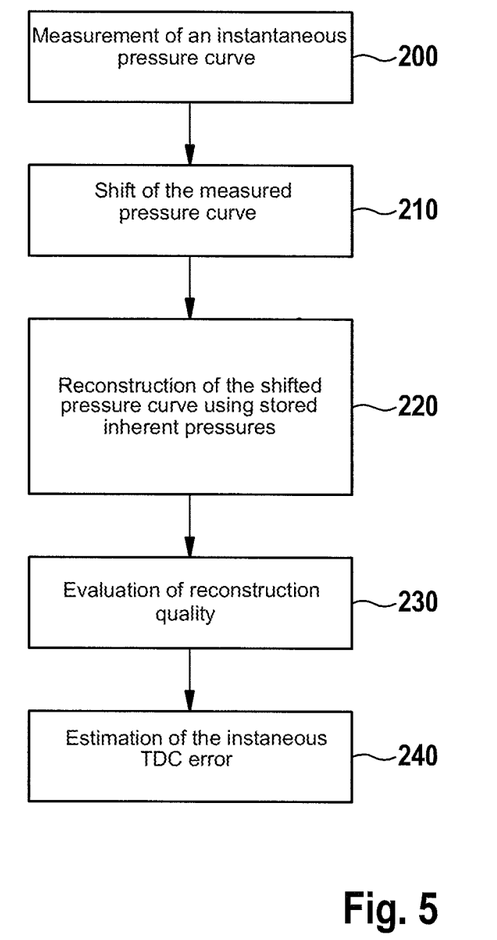
FIG. 5 shows one exemplary embodiment of an evaluation of a reconstruction quality.

Subsequently, in block 230, a reconstruction quality of every single reconstructed inherent pressure curve is calculated and ascertained as the error between the reconstructed inherent pressure curve and the associated originally measured shifted combustion chamber pressure curve.

In block 240, the reconstruction qualities of all shifted curves relative to each other are compared. Shifting the instantaneously measured combustion chamber pressure curve artificially introduces a crankshaft angle shift, which according to FIG. 6 has a minimum value. The absolute value of the reconstruction error away from the minimum value increases steadily toward both sides. This minimum value of the crankshaft angle at which the minimum reconstruction error occurs corresponds to the estimation of the TDC error of the instantaneously measured combustion chamber pressure curve.

Figure 6:
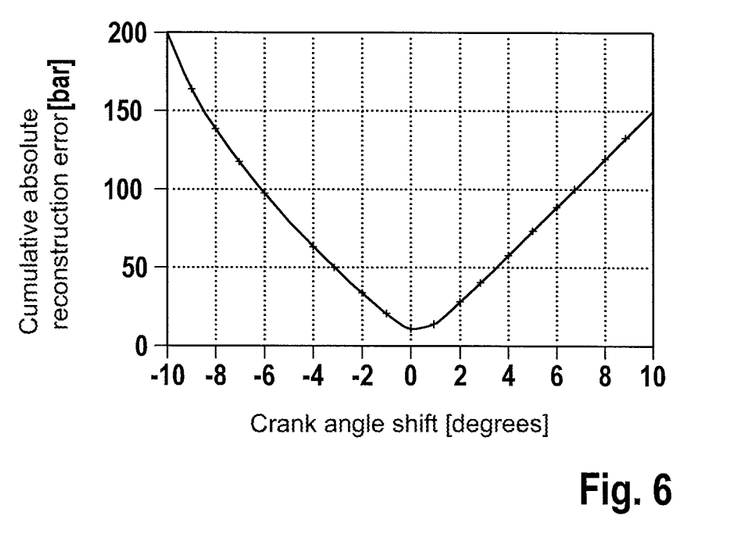
FIG. 6 shows one exemplary embodiment for determining a signal offset between a crankshaft angle and an internal combustion chamber pressure.

FIG. 6 shows the evaluation of the reconstruction quality of different, shifted version of the same measured combustion chamber pressure curve, which is defined as an error between the reconstructed and measured combustion chamber pressure curves. This curve was recorded under laboratory conditions, whereby it was possible to guarantee that no TDC error is present. For the evaluation, the curve was shifted in both crankshaft directions, whereby the artificially introduced TDC error is derived. For every shift, the reconstruction quality was evaluated using 10 inherent pressures $n_{PCA}$. The curve without shift may be restored the best in this case.

Figure 7:
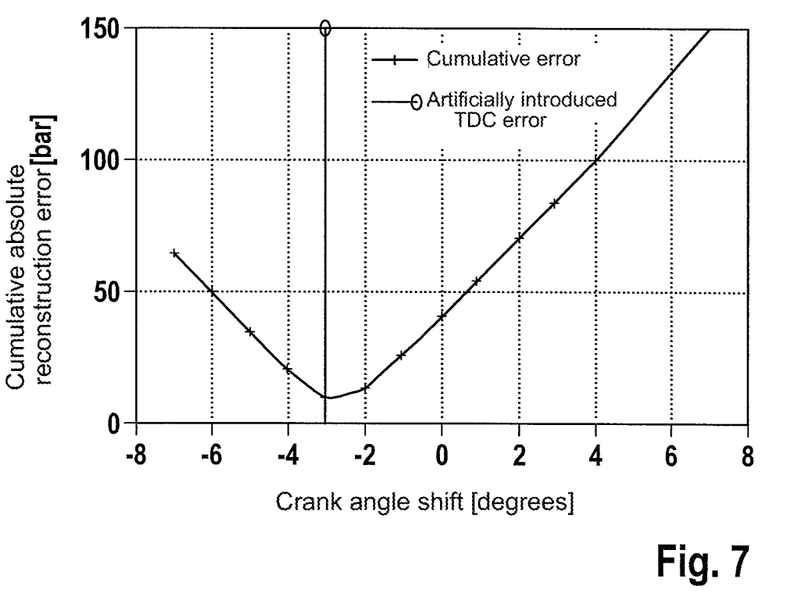
FIG. 7 shows one exemplary embodiment of a pressure profile including an artificially introduced signal offset.

Since it was assumed for the reference pressure curves that, on average, the best reconstruction occurs for zero TDC errors, this implies that the example curve measured in FIG. 7 must be shifted by a 3° crankshaft angle for the minimum value to be at a 0° crankshaft angle. It is precisely then that the pressure curve which was measured is crankshaft-synchronized with the reference pressure curves.

During the reconstruction of every single shifted version of the measured combustion chamber pressure curve having the inherent pressures calculated during the initialization, it is possible to evaluate the reconstruction quality of every shifted curve of the measured combustion chamber pressure profile. The negative value of the artificially introduced crankshaft offset of the shifted combustion chamber pressure curve having the best reconstruction quality is the estimation of the instantaneous TDC error. During the determination of the TDC error, it is also possible to shift the inherent pressures as an alternative to the measured combustion chamber pressure.

What is claimed is:

1. A method for determining a signal offset between a crankshaft angle signal and a combustion chamber pressure signal in an internal combustion engine, comprising:
   measuring the combustion chamber pressure signal;
   shifting an alignment of the measured combustion chamber pressure signal with respect to the crankshaft angle signal by a plurality of respective offset angles to generate a plurality of offset combustion chamber pressure signals;
   reconstructing the offset combustion chamber pressure signals using a plurality of predetermined inherent pressure curves to generate reconstructed combustion chamber pressure signals;
   determining reconstruction errors of the reconstructed combustion chamber pressure signals as a function of differences between the offset combustion chamber pressure signals and the reconstructed combustion chamber pressure signals; and determining the signal offset between the crankshaft angle signal and the combustion chamber pressure signal as a one of the plurality of offset angles producing the reconstruction error having the lowest value.

2. The method as recited in claim 1, wherein at least one reference pressure curve, from which the inherent pressure curves are calculated using a mathematical model, is measured.

3. The method as recited in claim 2, wherein a plurality of the at least one reference curves are measured over a predetermined crankshaft angle range at a plurality of different operating points of the internal combustion engine.

4. The method as recited in claim 2, wherein the at least one reference pressure curve is measured once.

5. The method as recited in claim 2, wherein the inherent pressure curves are determined from at least one reference pressure curve using a principal component analysis (PCA) method.

6. The method as recited in claim 2, wherein, from the at least one reference pressure curve, a signal offset between the crankshaft angle signal and the combustion chamber pressure signal of zero is assumed.

7. The method as recited in claim 1, wherein a predefined number of the inherent pressure curves over a predefined crankshaft angle range are used during the reconstruction.

8. A device for determining a signal offset between a crankshaft angle signal and a combustion chamber pressure signal in an internal combustion engine, comprising:

a combustion chamber pressure sensor and a crankshaft sensor configured to measure the combustion chamber pressure signal and the crankshaft angle signal of the internal combustion engine;

a processing unit configure to:

shift an alignment of the measured combustion chamber pressure signal with respect to the crankshaft angle signal by a plurality of respective offset angles to generate a plurality of offset combustion pressure signals;

reconstruct the offset combustion chamber pressure signals using a plurality of predetermined inherent pressure curves to generate reconstructed combustion chamber pressure signals;

determine reconstruction errors of the reconstructed combustion chamber pressure signals as a function of difference between the offset combustion chamber pressure signals and the reconstructed combustion chamber pressure signals; and determine the signal offset between the crankshaft angle signal and the combustion chamber pressure signal as a one of the plurality of offset angles producing the reconstruction error having the lowest value.

* * * * *